US008397376B2

(12) United States Patent
Meeker et al.

(10) Patent No.: US 8,397,376 B2
(45) Date of Patent: Mar. 19, 2013

(54) SYSTEM FOR AUTOMATED PRODUCTION PROCESSING OF SMART CARDS

(75) Inventors: Guy S. Meeker, Lakewood, CO (US); Francisco Pezzuti, Highlands Ranch, CO (US); Bryan Kingston, Littleton, CO (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 203 days.

(21) Appl. No.: 12/869,221

(22) Filed: Aug. 26, 2010

(65) Prior Publication Data

US 2012/0047716 A1 Mar. 1, 2012

(51) Int. Cl.
*B23P 21/00* (2006.01)
*B23Q 15/00* (2006.01)
(52) U.S. Cl. .......... 29/711; 29/721; 29/729; 29/742; 29/760
(58) Field of Classification Search .......... 29/593, 29/33 R, 430, 469, 711, 721, 729, 742, 760, 29/825
See application file for complete search history.

(56) References Cited

U.S. PATENT DOCUMENTS

| 5,674,758 | A | * | 10/1997 | McCarthy ............ 438/26 |
| 5,889,941 | A | | 3/1999 | Tushie et al. |
| 6,014,748 | A | | 1/2000 | Tushie et al. |
| 6,345,760 | B1 | | 2/2002 | Eason et al. |
| 6,402,028 | B1 | * | 6/2002 | Graham et al. ............ 235/380 |
| 6,588,673 | B1 | | 7/2003 | Chan et al. |
| 6,886,246 | B2 | * | 5/2005 | Chung .................... 29/832 |
| 6,902,107 | B2 | | 6/2005 | Shay et al. |
| 7,451,768 | B2 | * | 11/2008 | Ku ......................... 29/701 |
| 7,458,515 | B2 | | 12/2008 | Squires |
| 7,523,495 | B2 | | 4/2009 | Johnson |
| 7,669,055 | B2 | | 2/2010 | Everett et al. |
| 2008/0237356 | A1 | * | 10/2008 | Singleton et al. ........... 235/492 |
| 2009/0184166 | A1 | * | 7/2009 | Bhandarkar et al. ........ 235/492 |

* cited by examiner

*Primary Examiner* — Paul D Kim
(74) *Attorney, Agent, or Firm* — Marsh Fischmann & Breyfogle LLP

(57) ABSTRACT

A smart card processing system for processing a plurality of smart card portions on a smart card panel substantially simultaneously. The system may include a transfer member for moving card panels. Smart card panels may be loaded into an input magazine capable of elevating the panels with respect to a processing station. A transfer member may transport smart card panels from the input magazine to the processing station wherein one or more pre-personalization operations may be conducted. The transfer member may also be operative to move the smart card panels from the processing station to a marking station such that defective smart portions may be marked. The transfer may also move panels from the marking station to an output magazine. The output magazine may lower the smart card panels with respect to the marking station to accommodate more initiated smart card panels.

16 Claims, 14 Drawing Sheets

SYSTEM FOR AUTOMATED PRODUCTION PROCESSING OF SMART CARDS

FIELD OF THE INVENTION

The present invention generally relates to production processing related to the production of smart cards and particularly to automated production processing related to pre-personalization processing of panels of smart card portions for the production of smart cards (e.g., contactless smart cards).

BACKGROUND OF THE INVENTION

The term "smart card" is generally used to describe a card that employs an integrated circuit (IC) device (e.g., a microchip) to facilitate one or more functionalities of the card. Smart cards may be used in a variety of contexts (e.g., as phone cards, credit cards, debit cards, membership cards, transit cards, identification cards, etc.). The incorporation of IC devices provides additional features beyond the scope of those offered by traditional transaction cards (e.g., cards that employ a magnetic stripe or a bar code).

As may be appreciated, the realization of such additional features entails the transfer of data between a memory of a smart card and a card reader or other interface device. Such data transfer and additional functionalities are carried out in accordance with protocols associated with a given card operating system (COS) provided on a smart card. Data transfer between a smart card and a card reader may be facilitated by way of physical contact between a portion of the smart card and the card reader in the case of a "contact smart card" or may be facilitated by way of wireless communication between the smart card and the card reader (e.g., using RF or other wireless technologies) in the case of a "contactless smart card."

In light of the proprietary nature of information stored on a smart card, it is advantageous to provide security measures to protect such stored data from being accessed by unauthorized parties that may seek to exploit the proprietary data. To facilitate such security measures, the COS may comprise logic (e.g., an application or series of applications, executable files, etc.) stored on the smart card to facilitate secure transmission of data between a memory on the smart card and a card reader or the like. A variety of security regimes may be provided in conjunction with a COS to protect data transferred during use of a smart card, including, as an example, the use of various encryption techniques for encryption/decryption of transferred data. Non-limiting examples of various security regimes that may be employed on a smart card can be found in U.S. Pat. No. 5,682,031 to Geronimi, U.S. Pat. No. 5,684, 742 to Bublitz et al., and U.S. Pat. No. 7,353,403 to Kim, all of which are hereby incorporated by reference in their entirety.

During production processing of smart cards, "pre-personalization" processing operations may be employed prior to the personalization of a card for a given end user. The pre-personalization process may encompass a variety of operations, including unlocking the IC device (e.g., unlocking via a specific encryption key), loading and/or initialization of a COS specified by a given card issuer (e.g., a given credit card issuer, debit card issuer, gift card issuer, etc.), transfer and/or verification of security data utilized by a given card issuer, toggling a COS (e.g., selecting one of a plurality of preloaded COSs or applications specific to a customer or card issuer), testing of card functionality, re-locking the COS with customer specific transport key, etc. Each of such operations may entail a data signal interface between the smart cards and production processing componentry.

After pre-personalization, production processing of smart cards typically entails one or more operations that prepares each given smart card for use by a corresponding card issuee. By way of example, smart card personalization may entail printing operations, embossing operations, and/or data transfer operations (e.g., data transfer with an IC device or magnetic stripe).

SUMMARY OF THE INVENTION

A primary objective of the present invention is to provide improved systems and methods for pre-personalization production processing of smart cards. The present invention is particularly apt for pre-personalization production processing of contactless smart cards. It has been recognized that pre-personalization production processing may be completed for a given smart card issuer on a batch basis.

In turn, another objective of the present invention is to facilitate pre-personalization production processing of panels having a plurality of smart card portions, wherein each portion includes at least one IC device (e.g., a microchip). The smart card portions may be provided in "inlay" form (e.g., a microchip and other electronic componentry supportably connected to a plastic carrier layer). An inlay may be positioned adjacent to one or more layers of plastic core and/or plastic film and interconnected thereto (e.g., via a lamination process). In one approach, sheets of smart card portions may be provided that have undergone an interconnecting and/or laminating processes prior to pre-personalization processing. The pre-personalization process may be carried out on these connected or laminated sheets. In another approach, inlays may undergo the pre-personalization process prior to being laminated into sheets, wherein subsequent to pre-personalization processing, the processed inlay is laminated with one or more layers as described above. In any regard, subsequent to lamination, sheets having smart card portions that have undergone pre-personalization production processing may be stamped or otherwise separated into individual smart cards and personalized.

Thus, the pre-personalization processes may be performed on sheets that have undergone interconnecting and/or laminating or inlays prior to interconnecting and laminating. The discussion contained herein may reference "smart card panels." It is to be understood that the use of the term "smart card panel" may be used to reference both inlays that have yet to undergo lamination as well as sheets having undergone at least one interconnection or lamination step, unless otherwise expressly stated otherwise. Thus, the present invention may be carried out on inlays; sheets having undergone some lamination that require further lamination steps prior to personalization or shipping; or sheets having undergone all lamination processes such that the sheets are ready for separation and personalization.

An inventive system for automated production processing of smart cards is presented. The system is particularly apt to perform production processing on contactless smart cards. The system includes an input magazine, a processing station, and an output magazine. The input magazine is adapted to store a plurality of panels. Each of the plurality of panels includes a plurality of smart card portions arranged in a predetermined array pattern, and each of the plurality of smart card portions includes an integrated circuit device. The processing station of the system is automated to successively perform a processing operation with respect to each of the plurality of panels. The processing operation relates to operability of each of the integrated circuit devices. Additionally, for each given one of the plurality of panels, the processing station is automated to perform the processing operation substantially simultaneously with respect to each of the corresponding plurality of smart card portions thereof. The output magazine is adapted to store a plurality of panels.

The system also includes a transfer member automated to sequentially transfer each of the plurality of panels between a plurality of predetermined locations within the system. In a related aspect, the transfer member may be automated to simultaneously transfer at least two different ones of the plurality of panels sequentially between different ones of the plurality of predetermined locations within the system. In this regard, the transfer member may be operative to engage two panels at two different predetermined locations within the system and transport each of the panels simultaneously. The different ones of the plurality of predetermined locations may correspond with different ones of the input magazine, the processing station, and the output magazine. Additionally, the plurality of predetermined locations may lie in substantially a common plane. In this regard, as the panels are transported within the system, the transport member may move relative to the common plane to facilitate advancement of panels in the system.

In another aspect, the input magazine and the output magazine may both be operable to store the plurality of smart cards in a substantially parallel, stacked relation. In turn, each of the input magazine and output magazine may accommodate a stack of panels corresponding to a batch. The input magazine may be located at a first corresponding one of the plurality of predetermined locations, and the output magazine may be located at a second corresponding one of the plurality of predetermined locations. In turn, the input magazine may be automated to sequentially move the plurality of panels stored therein into the first corresponding one of the plurality of predetermined locations. For instance, the input magazine may sequentially move the plurality of panels from an offset, parallel, stacked relation relative to the first corresponding one of the plurality of predetermined locations into the first corresponding one of said plurality of predetermined locations. As such, a panel that has been moved into the first corresponding one of the plurality of predetermined locations may be engaged by the transport member and advanced within the system. Additionally, the output magazine may be automated to sequentially move the plurality of panels from the second corresponding one of the plurality of predetermined locations. For instance, the output magazine may sequentially move the plurality of panels from the second corresponding one of the plurality of predetermined locations into an offset, parallel, stacked relation relative to the second corresponding one of the plurality of predetermined locations. In this regard, a panel disposed at the second corresponding one of the plurality of predetermined locations by the transfer member may be removed from that predetermined location by the output magazine.

In another aspect, the processing station may be automated to perform at least one of a number of processing operations. One of these processing operations may include a testing operation to automatically test at least one predetermined functionality relating to each of the integrated circuit devices. In addition, the testing operation may be operable to generate an output signal indicative of any given smart card portion having a corresponding test failure.

Furthermore, the processing operations may include an activation operation to activate an operating system for each of the integrated circuit devices. The integrated circuit devices may have one or more operating systems or applications preloaded thereon prior to the processing operations. As such, the processing operations may include selection and activation of an appropriate COS or application for the card (e.g., selection of a VISA™ or MasterCard™ specific COS or card application depending on the card issuer). Also, the processing operations may include a locking operation to lock each of the integrated circuit devices with security data (e.g., a customer specific transport key). Also, the processing operations may include a marking operation that is responsive to the output signal to mark the any given smart card portion having a corresponding test failure. The marking operation may enable automated recognition of the any given smart card portion having a corresponding test failure.

In yet another aspect, the processing station may perform the testing operation, and the system may also include a second processing station that is automated to perform the marking operation on the any given smart card portion having a corresponding testing failure. The second processing station may include a plurality of punch and die stations disposed in relative locations corresponding to the predetermined array pattern. The punch and die stations may be operable to remove a portion within or adjacent to the any given smart card portion having a corresponding testing failure. In an embodiment, the punch and die stations may have a first plurality of punch and die stations disposed in relative locations corresponding to the predetermined array pattern for a first panel and a second plurality of punch and die stations disposed in relative locations corresponding to the predetermined array pattern for a second panel. The first plurality of punch and die stations and said second plurality of punch and dies stations may be adjustable between an adjacent relative position and a spaced apart relative position. In turn, the marking operation may be performed simultaneously on more than one panel where the panels are in a spaced apart relation. Additionally, due in part to the adjustability of the first plurality of punch and die stations and the second plurality of punch and die stations relative to one another, the same punch and die stations may be used to perform the marking operation on a single panel of smart card portions.

In another aspect, the processing station may include a plurality of communication devices disposed in relative locations corresponding to the predetermined array pattern and automated to communicate signals substantially simultaneously with respect to each of the of said plurality of smart card portions. The plurality of communication devices may be operative to perform the processing operation with respect to a corresponding one of the plurality of smart card portions for each given one of the plurality of panels. In turn, each of the plurality of smart card portions may include an antenna, and the testing operation may automatically test at least one predetermined functionality relating to the antenna for each of the plurality of smart card portions. In this regard, the plurality of smart card portions may include functionality associated with contactless smart cards.

The communication devices may include a transceiver automated for wireless signal communication with the antenna. In one embodiment, a first plurality of transceivers may be disposed in relative locations corresponding to the predetermined array pattern for a first panel, and a second plurality of transceivers may be disposed in relative locations corresponding to the predetermined array pattern for a second panel. In turn, the first plurality of transceivers and the second plurality of transceivers may be adjustable between an adjacent relative position and a spaced apart relative position. Accordingly, as in the case of the first and second plurality of punch and die stations, the first and second plurality of transceivers may be used to process panels that are both located at the processing station and spaced apart as well as a single panel at the processing station.

Also, an inventive method for automated production processing of smart cards (e.g., contactless smart cards) is presented. The method includes loading a plurality of panels to an input magazine. Each of said plurality of panels includes a plurality of smart card portions arranged in a predetermined array pattern, and each of the plurality of smart card portions includes an integrated circuit device. The method also involves successively performing an automated production processing operation with respect to each of the plurality of panels. The automated production processing operation relates to operability of each of the integrated circuit device. For each given one of the plurality of panels the automated production processing operation occurs substantially simultaneously with respect to each of the corresponding smart card portions thereof. The process further includes unloading the plurality of panels from an output magazine. The method includes sequentially advancing each of the panels between different ones of a plurality of predetermined locations within the system.

In one aspect, at least two different ones of the plurality of panels may be sequentially advanced simultaneously between two different ones of the plurality of predetermined locations within the system. The different ones of the plurality of predetermined locations may correspond with different ones of the input magazine, a processing station, and the output magazine.

The automated production processing operation may include a number of separate operations. The operations may include automatically testing at least one predetermined functionality relating to each of the integrated circuit devices. The testing may also include generating an output signal indicative of any given smart card portion having a corresponding testing failure. Additionally, the operations may include activating an operating system for each of the integrated circuit devices. Also, the operations may include locking each of the integrated circuit devices with security data. Further still, the operations may include marking, in response to the output signal, any given smart card portion having a corresponding testing failure to enable automated recognition of the any given smart card portion having a corresponding testing failure.

Also, an inventive production method for smart cards including a method for automated production processing of smart cards is provided that includes the above described inventive method for automated production processing of smart cards. In addition to the above described method for automated production processing of smart cards, the production method may include printing on a core material, interconnecting each of the plurality of panels with corresponding core material, laminating each one of the plurality of panels with the corresponding core material, separating each of the smart card portions from each given one of the plurality of panels laminated with the corresponding core material, and personalizing the smart card portions. In the production method, the above described method for automated production processing of smart cards may occur prior to a lamination operation, between lamination operations, or subsequent to any lamination processes. In this regard, the automated production processing method may be conducted on card inlays that have yet to undergo additional processing necessary to complete a smart card for an end user. Alternatively, the production processing method may be carried out on laminated sheets. The production process may include automatically rejecting the any given smart card portion having a corresponding testing failure prior to the personalizing.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a vacuum transfer unit includes "a vacuum pickup" alone does not mean that the vacuum transfer unit includes only a single vacuum pickup). Moreover, any failure to use phrases such as "at least one" also does not limit the corresponding feature to the singular (e.g., indicating that a vacuum transfer unit includes "a vacuum pickup" alone does not mean that the vacuum transfer unit includes only a single vacuum pickup). Use of the phrase "at least generally" or the like in relation to a particular feature encompasses the corresponding characteristic and insubstantial variations thereof (e.g., indicating that a vacuum transfer unit moves at least generally perpendicularly encompasses the vacuum transfer unit being moved perpendicularly). Finally, a reference of a feature in conjunction with the phrase "in one embodiment" does not limit the use of the feature to a single embodiment.

DETAILED DESCRIPTION

Figure 1:
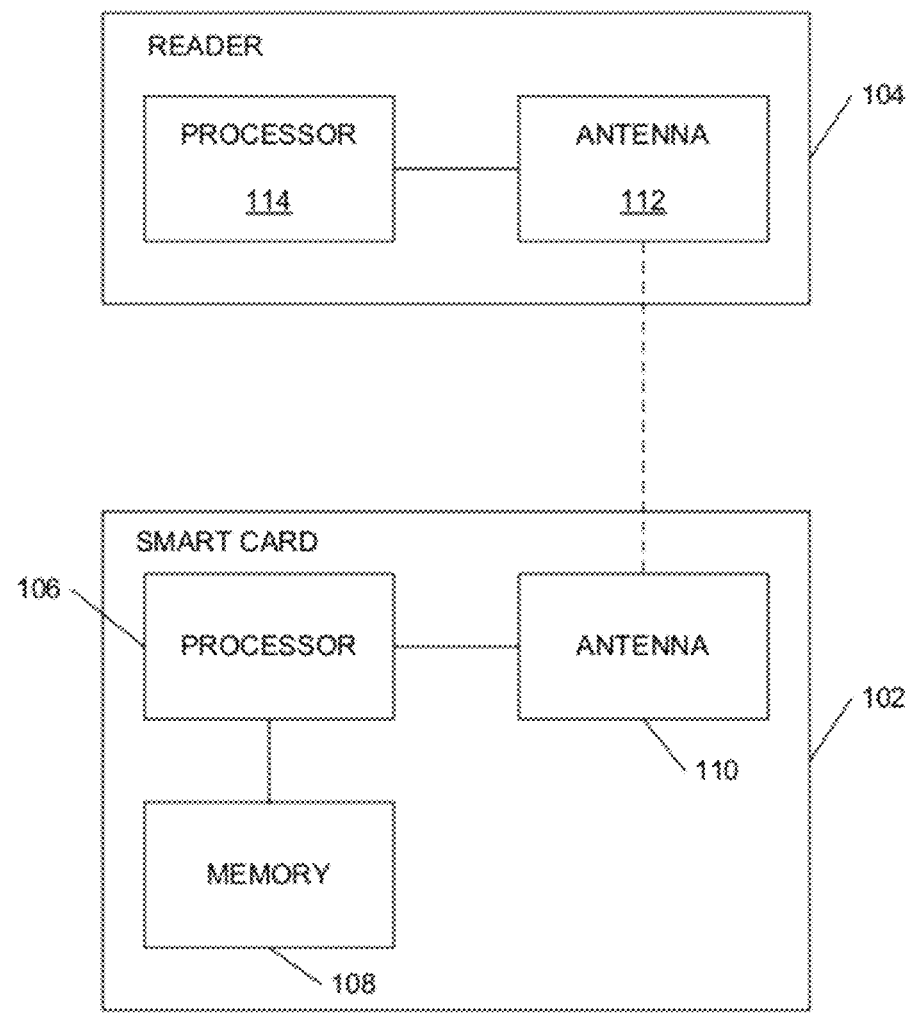
FIG. 1 is a schematic view of an embodiment of a smart card device in operative communication with a card reader.

While the invention is susceptible to various modifications and alternative forms, specific embodiments thereof have been shown by way of example in the drawings and herein described in detail. It should be understood, however, that it is not intended to limit the invention to the particular form disclosed, but rather, the invention is to cover all modifications, equivalents, and alternatives falling within the scope of the invention as defined by the claims.

FIG. 1 is a schematic drawing of a smart card 102 in operative communication with a card reader 104. The smart card 102 may include a card processor 106 in operative communication with a card memory 108. The card processor 106 may be operative to read to and write from the card memory 108. In this regard, information (e.g., data signals) may be exchanged between the smart card 102 and the card reader 104.

The card processor 106 may execute a card operating system (COS). The COS may facilitate secure communications between the smart card 102 and the card reader 104. In one example, the COS may employ encryption techniques to securely communicate data signals between the smart card 102 and the card reader 104. Accordingly, the probability of unauthorized exchange of data between the smart card 102 and an unauthorized device may be lessened by the use of the COS executing on the card processor 106 to control communications between the card reader 104 and the smart card 102.

Additionally, the COS may provide rules or other security measures regarding the ability to access the card memory 108 to alter or retrieve data stored in the card memory 108 (e.g., to write to or read from the card memory 108). For instance, the COS may dictate the conditions necessary (e.g., authentication of a communications device, presence of encryption keys in transmissions, etc.) for access to portions of the card memory 108 based on a security regime implemented by the COS. Also, the COS may provide a data structure, file format, data hierarchy, and other attributes necessary for the operation of the COS to execute functionalities of the smart card 102.

The smart card 102 may include a card antenna 110 in operative communication with the card processor 106. In this regard, the smart card 102 may be a contactless smart card whereby communication with the card reader 104 is facilitated wirelessly (e.g., using radio-frequency technology or the like). While not shown, alternative arrangements may be provided wherein a smart card may include electric contacts (e.g., electrically conductive contacts provided on a surface of the smart card) that are contactable with a card reader to facilitate operative communication between the smart card and the card reader. The card antenna 110 may be in wireless communication with a card reader antenna 112 at the card reader 104. The reader antenna 112 may receive data from and may transmit data to the card processor 106 of the smart card 102 by way of the card antenna 110. The reader antenna 112 may be in further communication with a reader processor 114 that may control the reader antenna 112 in order to send data signals to the smart card 102.

Accordingly, the card reader 104 may be used to exchange data signals between the card reader 104 the smart card 102. Data signals may be exchanged between the card reader 104 and the smart card 102 in order to provide one or more functionalities of the smart card 102. Additionally, the card reader 104 may also be used during the production of the smart card 102 to transmit data thereto. For instance, the COS, file structure, a file hierarchy, a data format, attribute data, security data, or other information may be transmitted from the card reader 104 to the smart card 102 during the production of the smart card 102.

Figure 2:
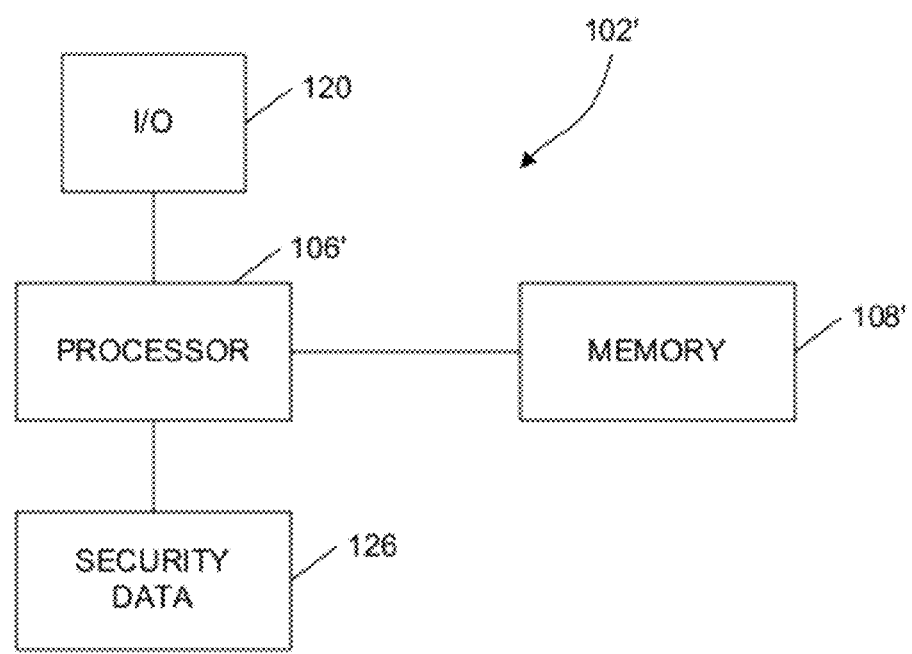
FIG. 2 is a schematic view of an embodiment of a smart card.

One implementation of the smart card 102 of FIG. 1 is presented in FIG. 2 in the form of a smart card 102'. Corresponding components between the embodiments of FIGS. 1 and 2 are identified by the same reference numerals. Those corresponding components that differ in at least some respect from the embodiment of FIG. 1 are identified by a "single prime" designation in FIG. 2. Unless otherwise noted herein, the discussion presented with regard to the embodiment of FIG. 1 remains equally applicable to the embodiment of FIG. 2 (including in relation to each of the individual components thereof).

In the embodiment depicted in FIG. 2, a card processor 106' may be in operative communication with a card I/O 120. The card I/O 120 may comprise an antenna for wireless communication (e.g., as in the case of the antenna 110 in FIG. 1) or may comprise other I/O features known in the art (e.g., electronic contacts on the surface of the smart card 102').

The card processor 106' may be in operative communication with a memory 108'. The card processor 106' may also be in operative communication with security data 126 stored on the smart card 102'. The security data 126 may be used by a COS to facilitate secure communication between the smart card 102' and a reader or other similar device. In one embodiment, the security data 126 may be an encryption key for providing secure communication as is known in the art. In this regard, when a request to read or write data received at the card I/O 120 is executed by the processor 106', the request may require an appropriate encryption key corresponding to the security data 126 in order for the processor 106' to process the request and access the memory 108' to read or write data thereto.

During the production of the smart cards 102 and 102' depicted in FIGS. 1 and 2, a step in the manufacturing process of the smart cards 102 and 102' may be initialization of the COS such that secure data transmission may be facilitated by the COS. The initialization may include loading a COS, selecting a COS from a plurality of pre-loaded COSs, activation of a COS, etc. As the COS may be responsible for the protection of proprietary data stored on the smart cards 102 and 102', the initialization of the COS, as well as other manufacturing steps such as quality assurance and other processes, may be performed on the smart cards 102 and 102' prior to a personalization process where such proprietary data may be stored on the smart cards 102 and 102'.

Figure 3:
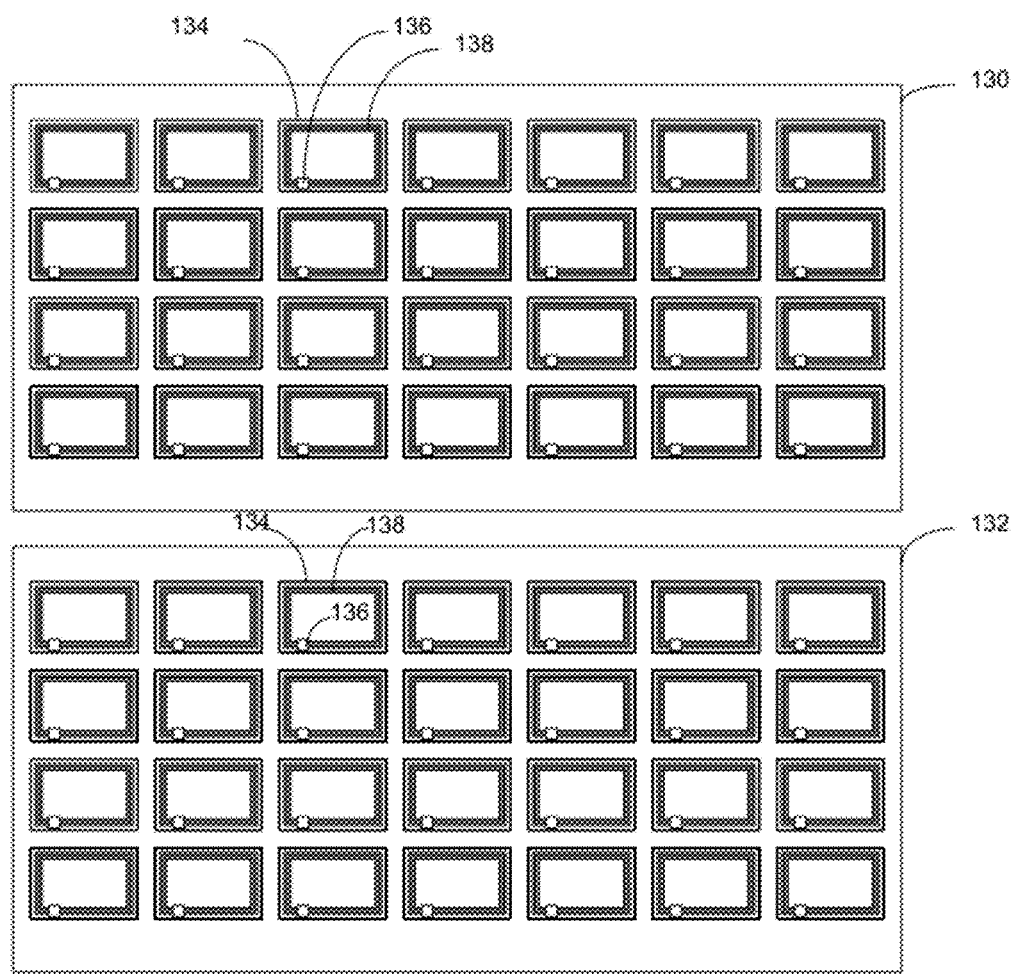
FIG. 3 is a top plan view of an embodiment of an arrangement of a first and a second panel having a plurality of smart card portions disposed in a predetermined array pattern.

Turning to FIG. 3, a first panel 130 and a second panel 132 are shown in a configuration as they may be provided during a pre-personalization process. The panels 130 and 132 may be smart card inlays that include a plurality of IC devices (e.g., microchips) and other electronic componentry supportably connected to a plastic carrier layer. The first panel 130 and second panel 132 may each include a plurality of smart card portions 134. Each smart card portion 134 may include an IC device 136 (e.g., a microchip having a memory and processor) that is supportably connected to the plastic carrier layer. Additionally, an antenna 138 may be supportably connected to the plastic carrier layer for each smart card portion 134. Accordingly, each of the smart card portions 134 may correspond to a finished smart card that may be produced from the inlay.

Alternatively, the panels 130 and 132 may include card inlays that have been interconnected to additional layers of materials (e.g., core material, plastic laminate, printed layers, etc.). These layers may be laminated to form a sheet of interconnected layers that define smart cards ready for separation from the sheet. In turn, each of the smart card portions 134 may be punched, separated, or otherwise removed from the remainder of the sheet to produce a smart card after the pre-personalization processing. As such, the first or second panel 130 or 132 may be provided as an inlay or sheet. As stated above, "panel" as used herein may refer to a product in various stages of production. For example, "panel" may refer to an inlay; a sheet having undergone some, but not all lamination processes; or a sheet having undergone all lamination processes such that smart card portions are ready for separation from the sheet. Thus, "panel" is not intended to connote the stage of processing of the product upon which production operations are performed and the discussion contained herein is equally applicable regardless of the stage of processing of the product unless expressly stated otherwise.

In any regard, the card portions 134 may be provided in a predetermined array pattern or grid such that the plurality of card portions 134 are divided into a set number of rows and columns on the first and second panels 130 or 132 to define a predetermined array pattern. In one embodiment, the first panel 130 may include a predetermined array pattern of twenty-eight smart card portions 134 arranged in four rows and seven columns. The second panel 130 may also include a predetermined array pattern of twenty-eight smart card portions 134 arranged in four rows and seven columns.

Figure 4:
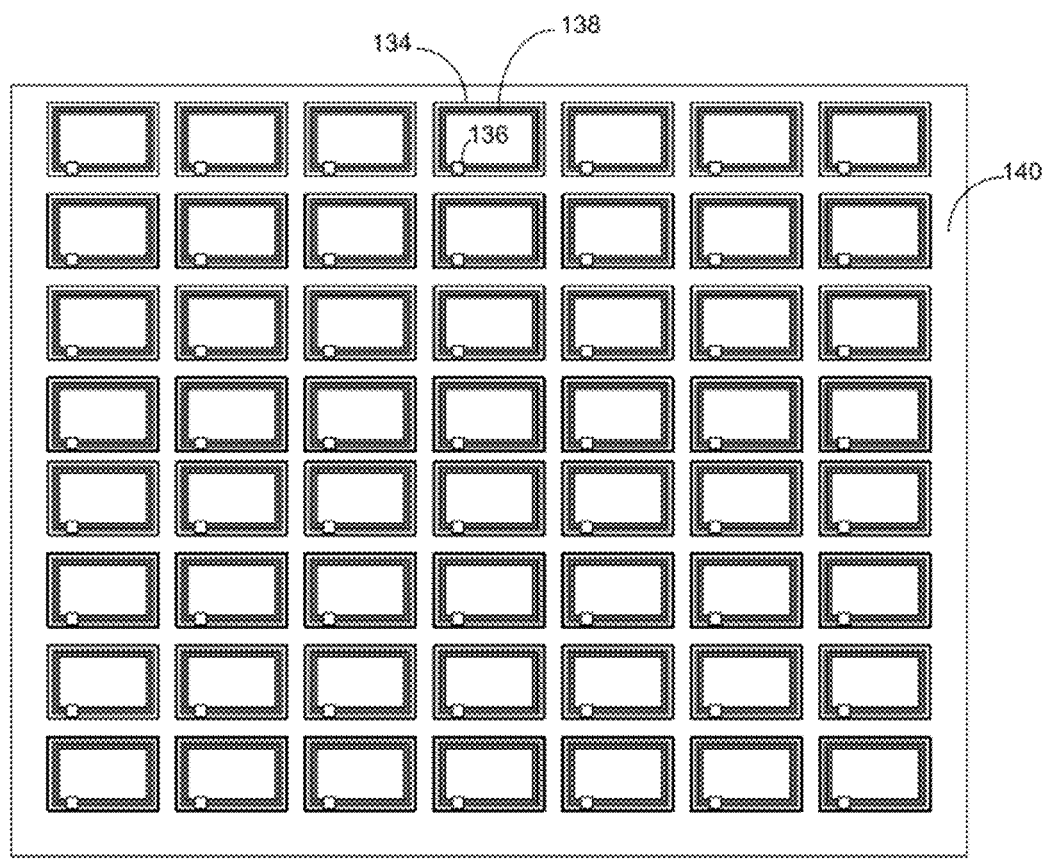
FIG. 4 is a top plan view of an embodiment of an arrangement of a third panel having a plurality of smart card portions disposed in a predetermined array pattern.

With further reference to FIG. 4, a third panel 140 is depicted. Corresponding components between the embodiments of FIGS. 3 and 4 are identified by the same reference numerals. Unless otherwise noted herein, the discussion presented with regard to the embodiment of FIG. 3 remains equally applicable to the embodiment of FIG. 4 (including in relation to each of the individual components thereof).

The smart card portions 134 of the third panel 140 may be arranged in a predetermined array pattern that contains the same number of smart card portions as a combination of the first panel 130 and the second panel 132. In one embodiment, the third smart card panel 140 may include a predetermined array pattern of fifty-six smart card portions arranged in eight rows and seven columns. The total number of rows of a composite of the first panel 130 and second panel 132 may equal the number of rows provided on the third panel 140. Similarly, the number of columns of smart card portions 134 provided on first panel 130 and the second panel 132 may equal the number of rows provided on the third panel 140. In this regard, the third panel 140 may be a composite of the first and second panels 130, 132 such that the third panel 140 represents a single panel comprising the same number of smart card portions 134 as the sum of the first and second panels 130 and 132.

A system for pre-personalization processing may be operative to process either the third panel 140 or process the first and second panels 130,132 collectively using substantially the same hardware with variations in the placement, arrangement, or spacing of the hardware to achieve the processing as will be discussed further hereinbelow. In any regard, during a pre-personalization operation, each smart card portion 134 of any given one of the panels 130, 132 or 140 may be automatically processed in a pre-personalization process substantially simultaneously. That is, each smart card portion 134 may be processed at the same time as every other smart card portion 134 of each given one of the panels 130, 132, or 140.

Figure 5:
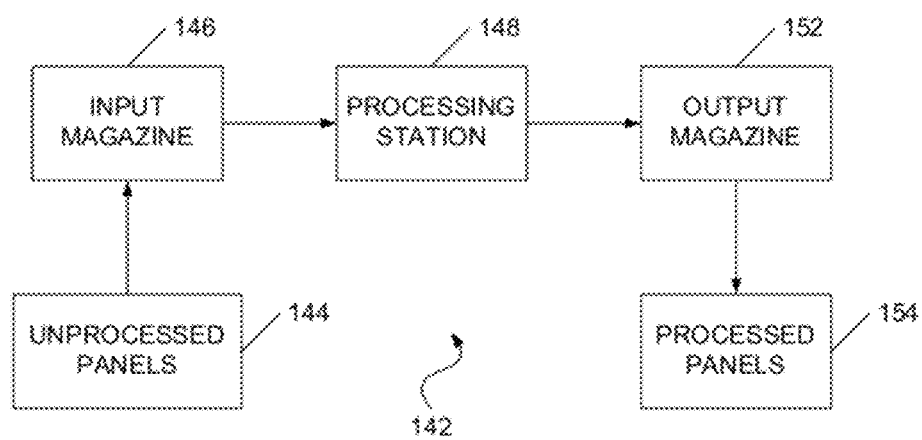
FIG. 5 is a schematic view of an embodiment of a system for pre-personalization processing of panels.

FIG. 5 is a schematic view of an embodiment of a system 142 for automated pre-personalization processing of smart card panel. Unprocessed panels 144 may be loaded in an input magazine 146. Unprocessed panels 144 may be panels such as those depicted with reference to FIG. 3 or 4 that have not undergone the pre-personalization process. Once the unprocessed panels 144 have been loaded into the input magazine 146, the system may be operative to automatically transport panels from the input magazine 146 to a processing station 148.

At the processing station 148, one or more pre-personalization processes may be automatically performed on the unprocessed panels 144. The initiation of the processing may be in response to a panel being disposed at the processing station 148. In this regard, appropriate sensors or logic may be provided to autonomously determine when a panel has been disposed at the processing station 148.

In one embodiment, a pre-personalization operation carried out at the processing station 148 may include a testing operation. The testing operation may include automatically verifying functionality relating to an electronic element (e.g., an IC device or an antenna) for each of the smart card portions of a panel. A testing failure may occur if a smart card portion fails to perform to certain predefined standards. The testing operation may further include generating an output signal for any given smart card portion that experiences a testing failure. In this respect, the output signal may indicate a defective smart card portion (i.e. a smart card portion that failed to conform with the predefined standards). This output signal may be used for later automated processing with respect to the defective card portion as will be discussed in more detail below.

One example of the testing operation may include attempting to establishing communication with and testing communication functionality of each of the smart card portions of the panels. Other quality assurance checks may also be performed on each of the smart card portions of the panels. For instance, specific functionality associated with an IC device (e.g., a microchip) for each smart card portion may also be tested during a pre-personalization process. Alternatively or additionally, specific functionality relating to an antenna for each smart card portion may be conducted.

Another pre-personalization operation that may also be automatically carried out at the processing station 148 may include initialization of a COS on each of the smart card portions. One or more COSs may already have been loaded in the memory of the smart card. In turn, the processing activity may include selection and initialization of a preinstalled COS to activate the operating system. Alternatively, the COS may be loaded into the memory of the smart card and in turn activated or initialized.

Yet another pre-personalization operation that may automatically occur at the processing station 148 may include a locking operation that includes transmitting security data to each of the card portions. The security data may be in the form of passwords, PINs, encryption keys, or other data types for providing secure exchanges of data signals known in the art. In this regard, each card portion may receive unique security data that may be used in later processing to provide secure access to a card memory. Additionally or alternatively, each card portion may receive substantially the same security data.

In one embodiment, the pre-personalization processing may be specific to a customer. In this regard, once the smart card portions undergo the pre-personalization processing, they may be delivered to a customer for personalization. For instance, a customer specific COS may be initialized on each smart card portion. Furthermore, security data corresponding to a particular customer (e.g., a customer specific transport key) may be transmitted to each smart card portion. In this regard, the smart card portions may be processed in a batch corresponding to a specific customer. That is, all unprocessed panels 144 loaded in the input magazine may be processed in a manner specific to a customer for whom the cards are being produced. Accordingly, for different batches corresponding to different customers, the pre-personalization process may differ in at least the COS initialized and the security data transferred to each smart card portion.

An additional pre-personalization operation performed by the system 142 may be a marking operation. As mentioned above, during the testing operation, an output signal may be generated for any of the smart card portions that experience a testing failure, such that the output signal may be indicative of a smart card portion having a corresponding testing failure. In response to this output signal, a marking operation may be operative to mark each smart card portion with a corresponding testing failure. The marking operation may include the use of marking devices that are able to mark smart card portions having a corresponding testing failure such that in later processing the marked smart card portions may be autonomously identified. Additionally, each processed smart card panel 154 may be marked to positively identify panels that have undergone the pre-personalization processing. Arrangements for marking smart card portions or smart card panels may include, but are not limited to, ink marking, die and punch stations, or other known marking techniques.

Processed panels 154, having undergone the pre-personalization processes, may be automatically disposed in an output magazine 152. In this regard, the output magazine 152 may store processed panels 154. Processed panels 154 may be removed from the output magazine 152 once the batch of smart cards has been processed.

Figure 6:
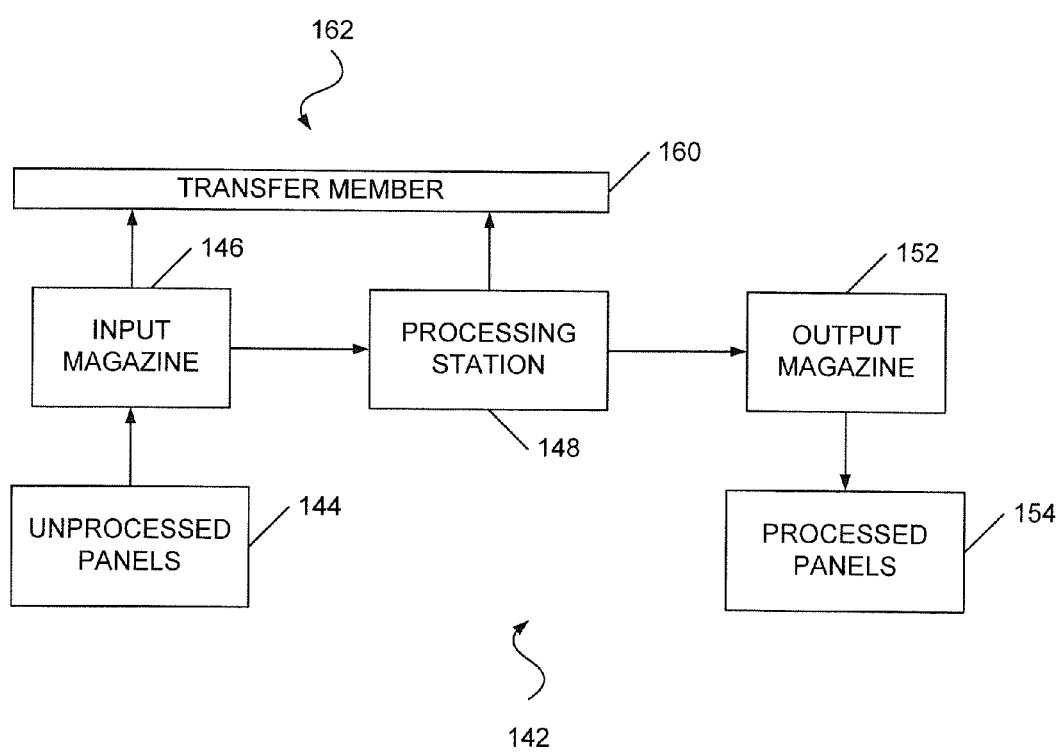
FIG. 6 is a schematic view of the embodiment of FIG. 5 of a system for pre-personalization processing of panels having a transfer member in a first position.
Figure 7:
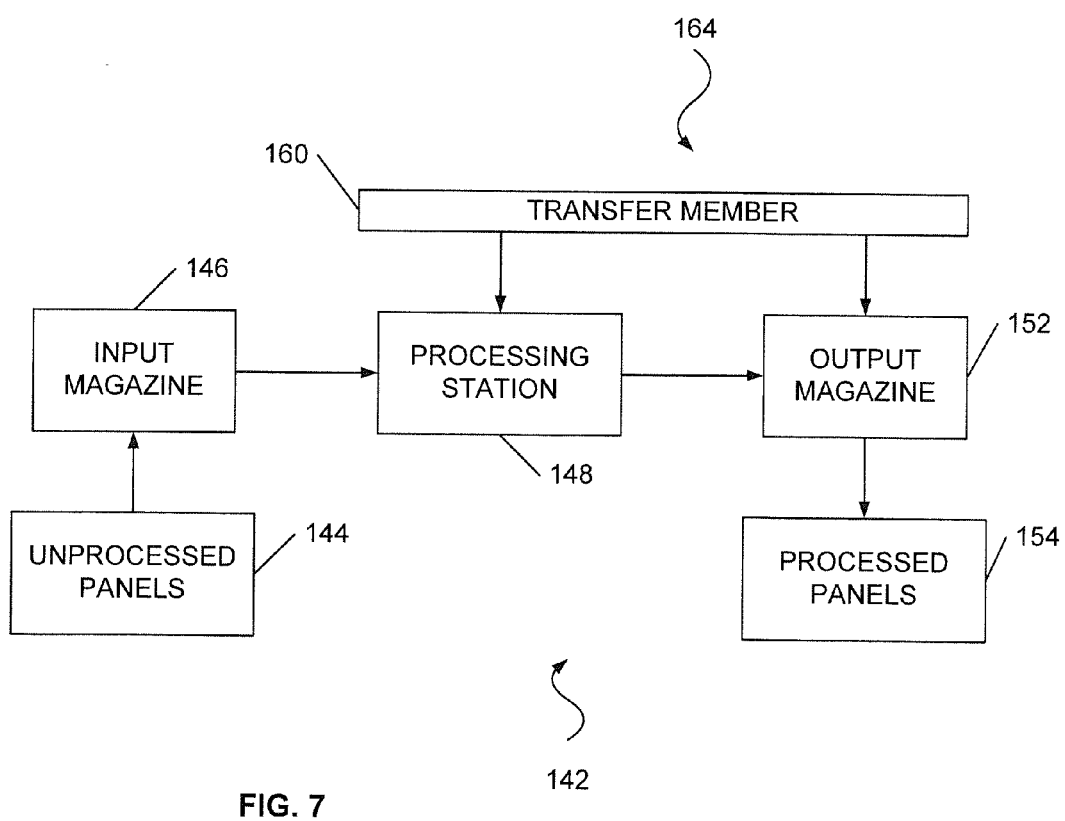
FIG. 7 is a schematic view of the embodiment of FIG. 5 of a system for pre-personalization processing of panels having a transfer member in a second position.

With further reference to FIGS. 6 and 7, the system 142 of FIG. 5 is shown with the addition of a transfer member 160. The transfer member 160 may be automated to sequentially transfer panels within the system 142 between predetermined locations within the system. For instance, the transfer member 160 may be operative to transfer at least two different panels between predetermined locations. The predetermined locations may correspond to the input magazine, the processing station, and the output magazine.

The transfer member 160 may be disposed in a first position 162 (as shown in FIG. 6) such that the transfer member 160 may be operative to engage panels at each of the predetermined locations corresponding to the input magazine 146 and the processing station 148. The transfer member 160 may be operative to grasp, retain, or otherwise selectively capture a panel when engaging a panel at one of the predetermined locations. In turn, the transfer member 160 may be moved to a second position 164 as shown in FIG. 7. The transfer member 160 may be operative to dispose, release, or otherwise disengage a panel when the transfer member 160 has moved such that the panels are disposed at a different one of the predetermined locations within the system. For instance, as shown in FIG. 7, when in the second position, the transfer member 160 may be operative to dispose a panel at each of the predetermined locations corresponding to the processing station 148 and the output magazine 152.

In this regard, panels may be automatically transported within the system 142 by moving the transfer member 160 between the first position 162 and the second position 164 to sequentially advance panels within the system from the input magazine 146 to the processing station 148 and from the processing station 148 to the output magazine 152. For example, a panel may be moved from the input magazine 146 when the transfer member 160 is in the first position 162 to the processing station 148 when the transfer member 160 is in the second position 164. In turn, the transfer member 160 may be operative to move a panel at the processing station 148 when in the first position 162 to the output magazine 152 when the transfer member 160 is in the second position 164.

Figure 8:
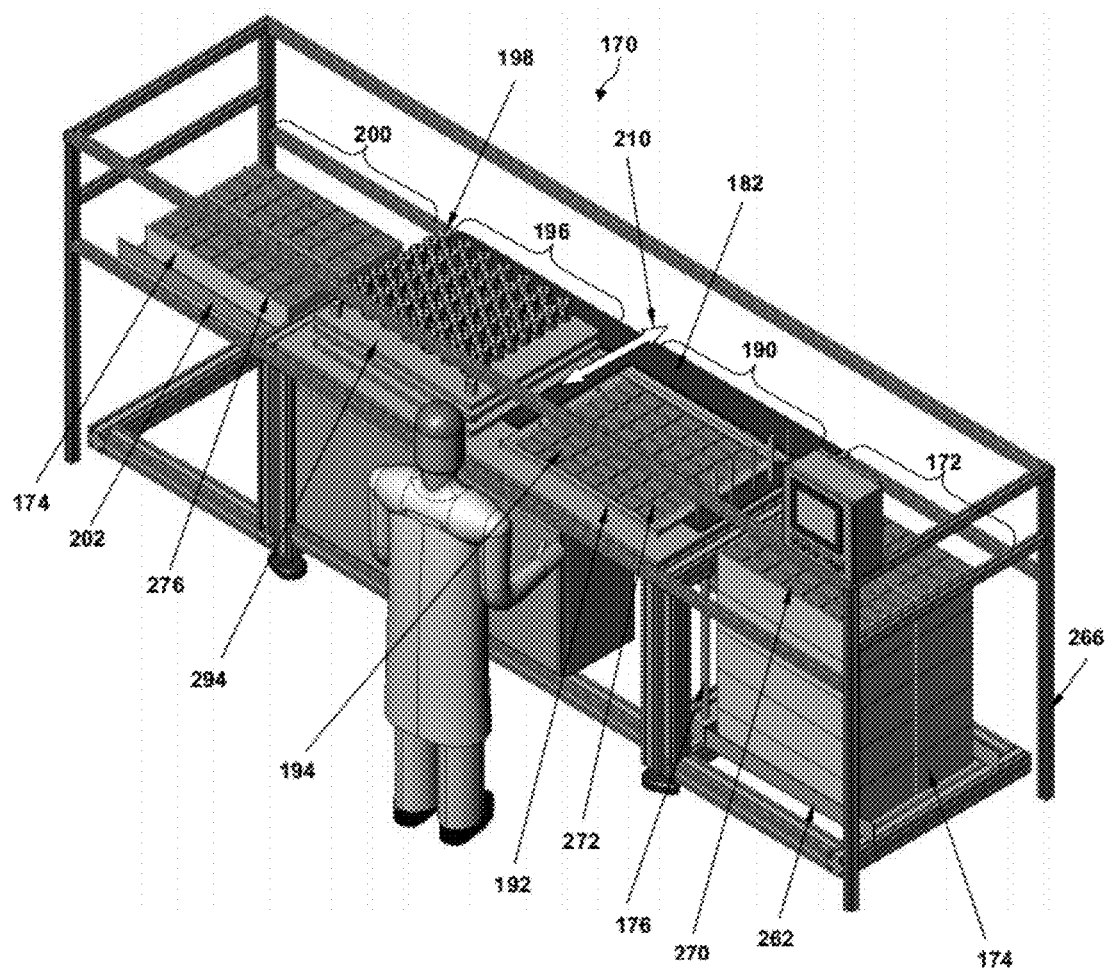
FIG. 8 is a perspective view of another embodiment of a system for pre-personalization processing of smart card panels.
Figure 9:
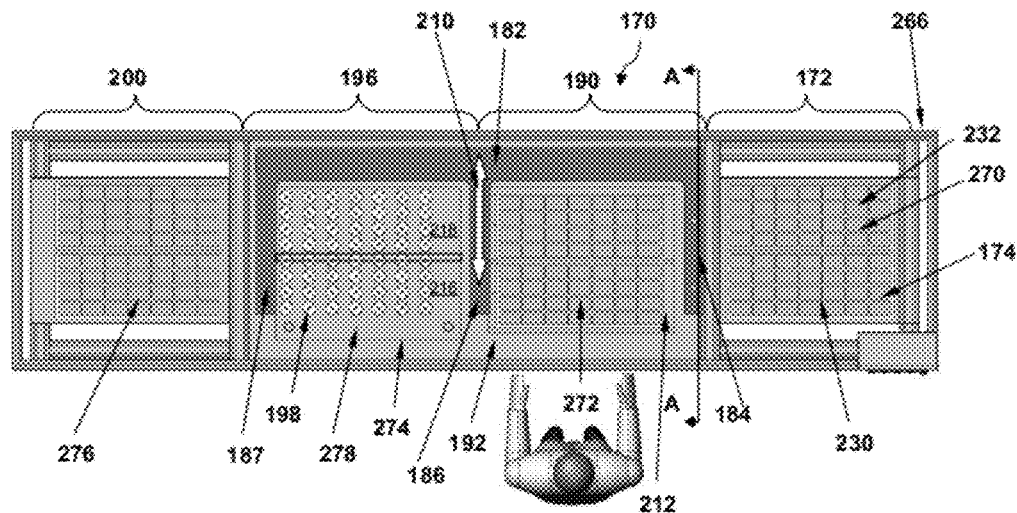
FIG. 9 is a top view of the embodiment of FIG. 8.
Figure 10:
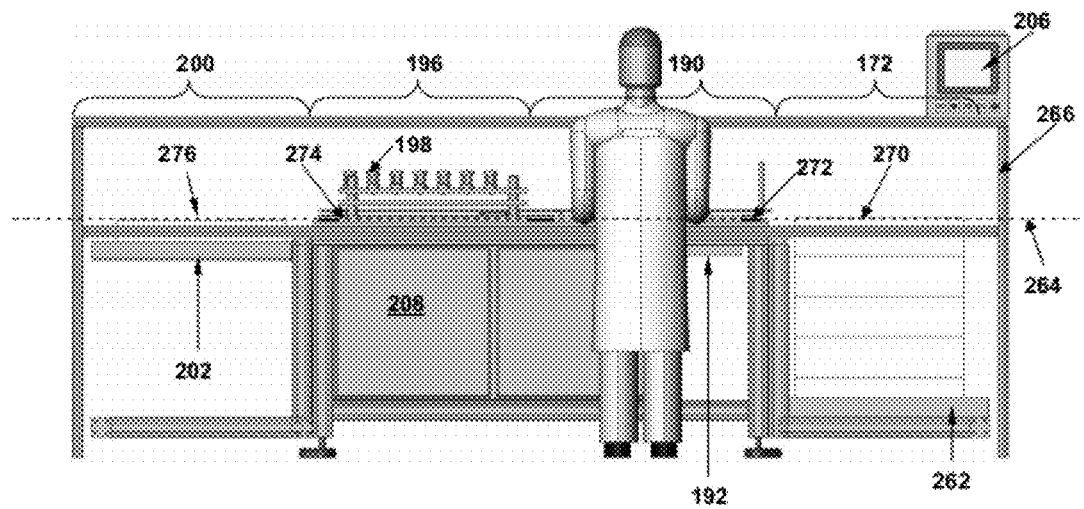
FIG. 10 is a front view of the embodiment of FIG. 8.

With reference to FIGS. 8, 9 and 10, another embodiment of a pre-personalization processing system 170 is depicted and described. The system 170 may include a frame constructed of extruded aluminum boltment 266 or the like. Guards (not shown) such as plastic or mesh panels may be provided between the boltment 266 to reduce the potential of an operator coming into contact with moving parts of the system 170 when in operation. The guards may be interlocked such that operation of the system requires the guarding be in place.

The system 170 may include four predetermined locations (270, 272, 274, and 276) within the system. The four predetermined locations 270, 272, 274, and 276 may correspond with an input magazine 172, a processing station 190, a marking station 196, and an output magazine 200, respectively. Panels may be sequentially advanced between the predetermined locations by a transport member 182. As shown best in FIG. 10, the predetermined locations may lie in a common plane 264 such that as panels are sequenced through the system by the transport member 182, the panels lie in a common plane 264 when positioned at one of the predetermined locations (270, 272, 274, 276).

The input magazine 172 may be adapted to accept a plurality of panels 174. The panels 174 may be arranged in the input magazine 172 such that the panels are arranged in a stacked arrangement and are generally parallel to and offset from the common plane 264. In one embodiment, the stack of panels may include a stack of one thousand fifty-six-card panels (e.g., in the form of inlays or laminated panels) having smart card portions arranged in a predetermined array pattern similar to the third smart card panel 140 shown with respect to FIG. 4.

The input magazine 172 may include a pallet tray 262 that may include linear bearings for receiving the stack of panels 174. A simple location system may automatically bias the stack of panels 174 to a known reference point in the system (e.g., relative to the first predetermined position) such that the stack of panels 174 may be oriented in a known relative position upon loading of the panels 174 into the input magazine 172.

The pallet tray 262 may form part of an input magazine elevator 176. The input magazine elevator 176 may include a lifting apparatus. In this regard, the lifting apparatus may be automated to move the input magazine elevator 176 including the pallet tray 262 such that the panels 174 may be moved relative to the first predetermined position 270. For instance, the lifting apparatus may include a reciprocating ball lead screw driven by a servo motor fitted with a gear box. In this regard, operation of the servo motor may in turn result in movement of the input magazine elevator 176 relative to the first predetermined position 270.

The input magazine elevator 176 may have an initial position offset from the common plane 264 such that panels 174 may be loaded into the input magazine 172. The stack of panels 174 may be stored in a stacked, parallel, offset relation to the common plane 264. The input magazine elevator 176 may be elevated from the initial position such that a panel 174 is moved into the first predetermined location 270. As panels 174 are retrieved from the input magazine 172, the input magazine elevator 178 may be automatically elevated to maintain a panel 174 in the first predetermined location 270. In one embodiment, a sensor (e.g., a photo eye) may be provided adjacent to the input magazine elevator 176 that is capable of detecting if a panel 174 is in the first predetermined position 270. Accordingly, the input magazine elevator 176 may move the panels 174 relative to the first predetermined position 270 until the sensor detects a panel 174 in the first predetermined position 270. When the panel 174 in the first predetermined position 270 is removed, the sensor may no longer sense a panel 174 in the first predetermined position 270, and the input magazine elevator 176 may be automatically moved relative to the first predetermined position 270 until the sensor again senses a panel 174 in the first predetermined position 270. The input magazine elevator 176 may be raised until all panels 174 have been removed from the input magazine 172 (e.g., as detected by a sensor or logic), at which point the input magazine elevator 176 may be lowered to its initial position and a new stack of panels 174 may be loaded into the input magazine 172.

The system 170 may also include a processing station 190 corresponding to a second predetermined location 272. The processing station 190 may include an antenna reader 192 including of a plurality of transceivers 194. It will be understood that the plurality of transceivers 194 may be provided and arranged such that one transceiver corresponds to each of the card portions of the panel 174 being processed at the processing station 190. Thus, the transceivers 194 may be positioned in a relative position with respect to a predetermined array pattern corresponding to the panel 174. The transceivers 194 may be operative to establish communication with each of the card portions (e.g., by way of an antenna thereof) of the panels 174 in order to perform a number of processes thereon as described above. It will be understood that as a transceiver 194 may be provided for each card portion on a panel 174, the transceivers 194 may act on each of the card portions of any given panel substantially simultaneously.

Also provided in the system 170 may be a marking station 196 corresponding to third predetermined location 274. The marking station 196 may comprise a plurality of punch and die stations 198 arranged on a "C" Frame die set 278. The punch and die stations 198 may be provided and arranged such that one punch and die station 198 corresponds to each of the card portions of the panels 174 being processed at the marking station 196. Thus, the punch and die stations 198 may be disposed in a relative position with respect to a predetermined array pattern corresponding to the panel 174. The punch and die stations 198 may be operative to remove a portion of the card portions in response to an output signal generated during a testing operation in order to mark card portions having a corresponding testing failure for later identification as described above. Additional punch and die stations 198 may be provided to mark each panel 174 for identification as a processed panel.

Also, an output magazine 200 may be provided corresponding to a fourth predetermined location 276. The output magazine 200 may be operative to store panels 174. Additionally, the output magazine 200 may include an output magazine elevator 202 that is automated to be moved relative to the fourth predetermined location 276. In this regard, the output magazine elevator 202 may also be provided with a lifting apparatus (not shown) similar to that described with regard to the lifting apparatus 178 of the input magazine 172. As such, the output magazine elevator 202 may be moved to an initial position relative to the common plane 264 such that initialized panels 204 may be deposited onto the output magazine elevator 202 such that the panels are in the fourth predetermined location 276. The output magazine elevator 202 may in turn be lowered so as to remove the panel 174 from the fourth predetermined location 276 as panels 174 are deposited at the fourth predetermined location 276. Once removed from the fourth predetermined location 276, the panels 174 may be stored in the output magazine 200 in a stacked manner such that the panels 174 are parallel to and offset from the common plane 264. In one embodiment, a sensor (e.g., a photo-eye) may be provided adjacent to the output magazine elevator 202 such that as panels 174 are deposited at the fourth predetermined location 276, the sensor may detect the panels 174 and the output magazine elevator 202 may in turn be moved relative to the fourth predetermined location 276 until the sensor no longer detects a panel 174 at the fourth predetermined location 276. Once the output magazine elevator 202 has reached an extent of its travel or a certain number of panels 174 have been deposited onto the output magazine elevator 202 (e.g., as detected by a sensor or logic), the output magazine 200 may be full and the panels 174 may be removed from the output magazine 200. In turn, the output magazine elevator 202 may again be elevated to the initial position to receive panels 174 in the fourth predetermined position 276.

The system 170 may also include a transfer member 182 adapted to move panels between the predetermined locations (270, 272, 274, and 276) within the system 170. The transfer member 182 may include a first vacuum transfer unit 184, a second vacuum transfer unit 186, and a third vacuum transfer unit 187. In this regard, each of the three vacuum transfer units 182, 186, and 187 may be operative to engage a panel at one of the predetermined locations (270, 272, 274, 276) and transport panels to a different one of the predetermined locations (270, 272, 274, 276). As such, three or more panels may be moved simultaneously by the transfer member 182 of the system 170.

With continued reference to FIG. 9, the vacuum transfer units 184, 186, and 187 may generally extend relative to the predetermined locations (270, 272, 274, 276) such that when disposed over one of the predetermined locations (270, 272, 274, 276), the vacuum transfer unit 184, 186, or 187 may be operative to engage a panel at a corresponding one of the predetermined locations (270, 272, 274, 276).

Figure 12:
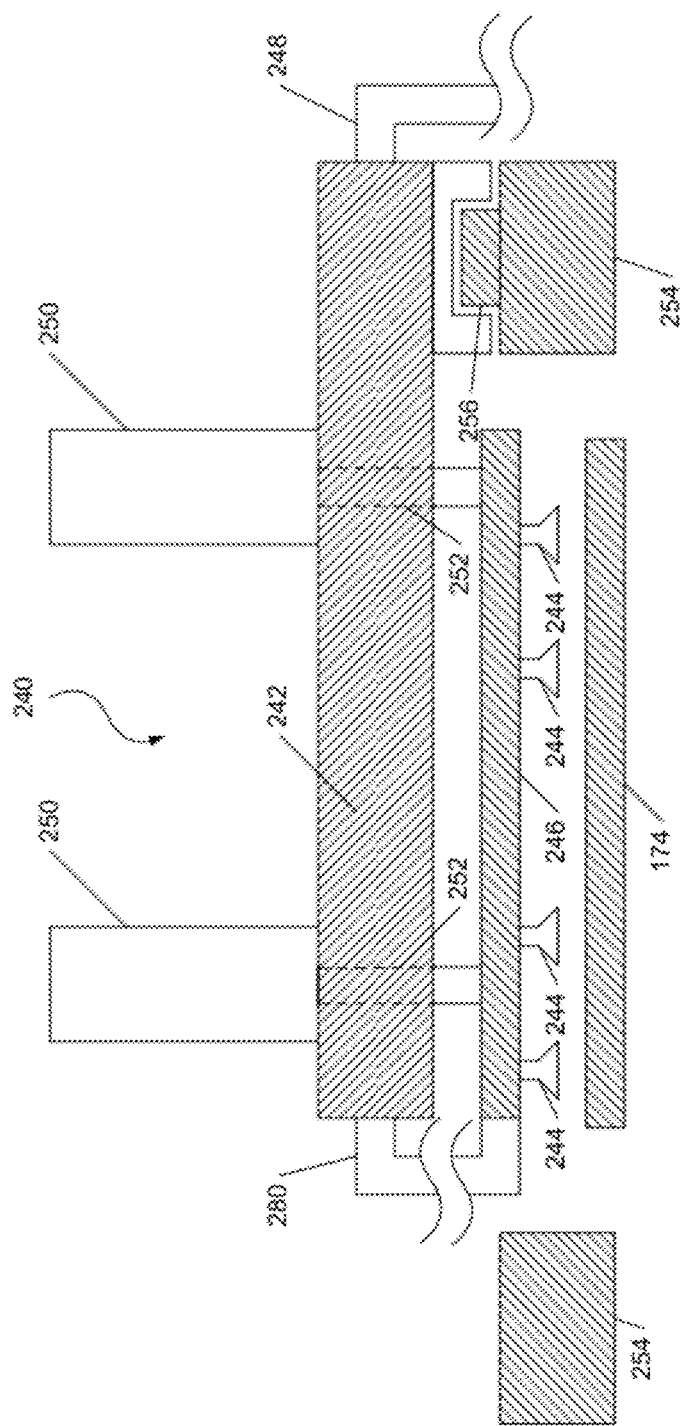
FIG. 12 is a side cross sectional view of an embodiment of a vacuum transfer unit taken along section line A-A in FIG. 9.

FIG. 12 presents a side cross-sectional view of one embodiment of a vacuum transfer unit 240 taken along section line A-A of FIG. 9. The vacuum transfer unit 240 may include a vacuum transport unit support arm 242 mounted to a reciprocating ball slide 256 which is in turn mounted to a frame 254 of the system 170. In this regard, the vacuum transfer unit support arm 242 may translate between a first position and second position that is generally along the longitudinal axis of the slide 256 and corresponds to motion of the vacuum transfer unit 240 between predetermined locations (270, 272, 274, and 276). The vacuum transfer unit support arm 242 may be driven and accurately positioned along the slide 256 by a servo motor and timing belt drive system (not shown). The vacuum transfer support arm 242 may be connected to a vacuum source via flexible vacuum tubing 248. A second flexible vacuum tubing 280 may extending between the vacuum transfer unit support arm 242 and a vacuum pickup frame 246. In this regard, vacuum may be selectively supplied to vacuum pickups 244.

A plurality of vacuum pickups 244 may be provided that enable the vacuum pickups 244 to engage a panel 174 disposed at one of the predetermined locations to retain the panel 174 under vacuum. In order for the vacuum pickups 244 to engage panel 174, one or more pneumatic actuators 250 may be provided to mount the vacuum pickup frame 246 to the vacuum transfer unit support arm 242. The pneumatic actuators 250 may include pneumatic actuator rods 252 that may extend to and connect with the vacuum pickup frame 246. In this regard, upon actuation of the pneumatic actuators 250, the vacuum pickup frame 246 may move relative to the panel 174 in one of the predetermined locations (270, 272, 274, 276). In this regard, the vacuum pickup frame 246 may allow for the vacuum pickups 244 to come into contact with and, under vacuum, engage the panel 174. In this regard, the vacuum pickup frame 246 along with the vacuum pickups 244 may be moved in a direction generally perpendicular to the motion enabled by the slide 256.

In one embodiment, the first vacuum transfer unit 184 may include pneumatic actuators 250 having a long stroke pneumatic slide so that the vacuum pickup frame 246 of the first vacuum transfer unit 184 can reach into the input magazine 172 to pick up the top panel from the magazine tray. The second and third vacuum transfer units 186 and 187 may include pneumatic actuators 250 having a short stroke slide.

With continued reference to FIG. 9, a top view of the system 170 is generally depicted. In one embodiment, a pair of panel stacks including a first panel stack 230 and a second panel stack 232 may be provided in the input magazine 172. In this regard, the transfer member 182 may be operative to engage two panels at the first predetermined location 270 and move them within the system 170. Accordingly, in one embodiment, at least one vacuum pickup 244 of the vacuum transfer units (184, 186, 187) may be operative to engage panels from each of the first panel stack 230 and the second panel stack 232.

To facilitate processing of panels from the first panel stack 230 and the second panel stack 232, the processing station 190 may be split into a first antenna reader 212 and a second antenna 214, each having a plurality of transceivers 194. In this regard, the first and second antenna readers 212 and 214 may be moved relative to each other to accommodate two panels at the second predetermined location 272. When processing a single stack of panels 174, the first and second antenna readers 212 and 214 may be moved relative to one another such that the antenna readers 212 and 214 are adjacent to each other to form a substantially continuous card reader surface. However, an adjustment mechanism may be provided (e.g., a simple lead screw and spacer mechanism) such that when processing panels from a first and second panel stack 230 and 232 simultaneously, the antenna readers 212 and 214 may be adjusted to a spaced apart relation corresponding to the spacing between the first panel stack 230 and the second panel stack 232. Adjustment may be provided in the direction of the arrow 210 shown in FIG. 9 such that the first and second antenna readers 212 and 214 may be adjusted to accommodate different sizes of or spacing between panels 174. The processing station 190 may include a simple pneumatic register system to orient the panels with respect to the readers 212 and 214.

Also, to facilitate processing of panels from a first panel stack 230 and a second panel stack 232, the marking station 196 may comprise a first reject punch member 216 and a second reject punch member 218, each having a plurality of punch and die stations 198, that are adjustable in a similar manner as the first and second antenna member 212 and 214. Each of the first reject punch member 216 and second reject panel member 218 may include a plurality of punch and die stations 198. That is, the first and second reject punch members 216 and 218 may be moved relative to each other in order to accommodate two panels at the marking station 196. In this regard, there may be a space provided between the panels at the marking station 196 such that the first and second reject punch members 216 and 218 may be moved in the direction of the arrow 210 in FIG. 9 to accommodate the spaced apart panels 174. In one embodiment, the first and second reject punch members 216 and 218 may be adjusted by way of a simple lead-screw and spacer.

The output magazine 200 may also be operative to accommodate two panel stacks such that spaced apart panels may be deposited on the output magazine 200 much in the same as the single panel operation described above.

Figure 11A:
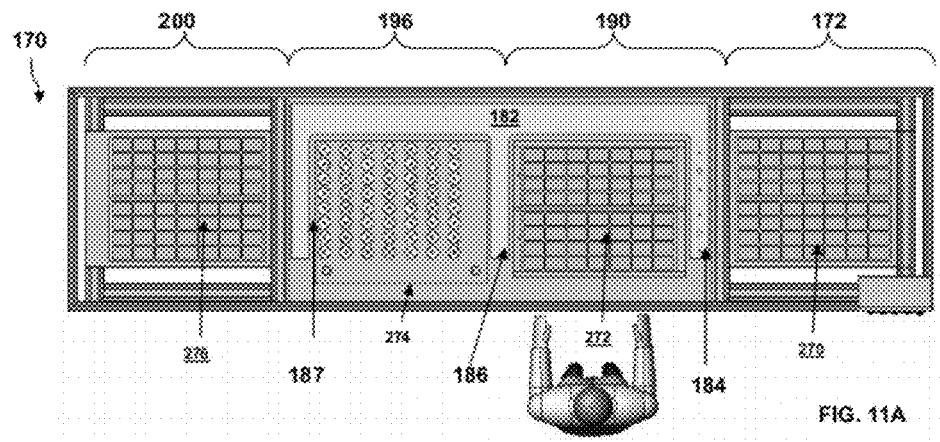
FIGS. 11A-C are top views of the embodiment of FIG. 8 showing a transfer member at a home, first, and second position, respectively.
Figure 11B:
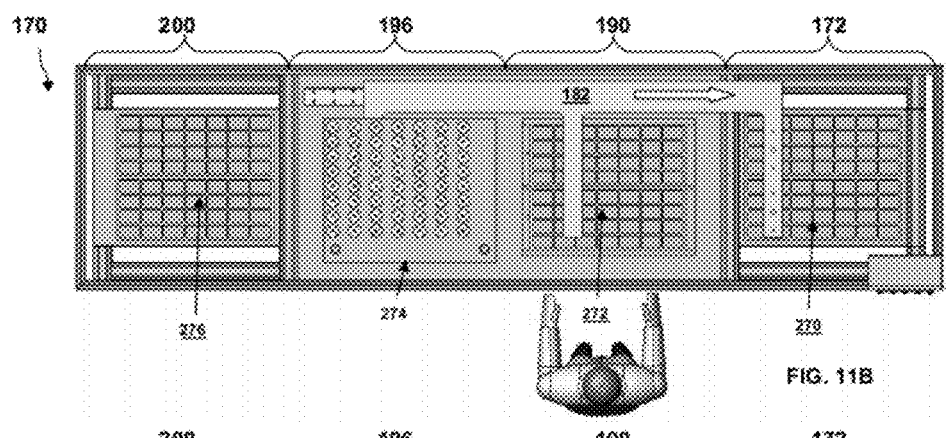
Figure 11C:
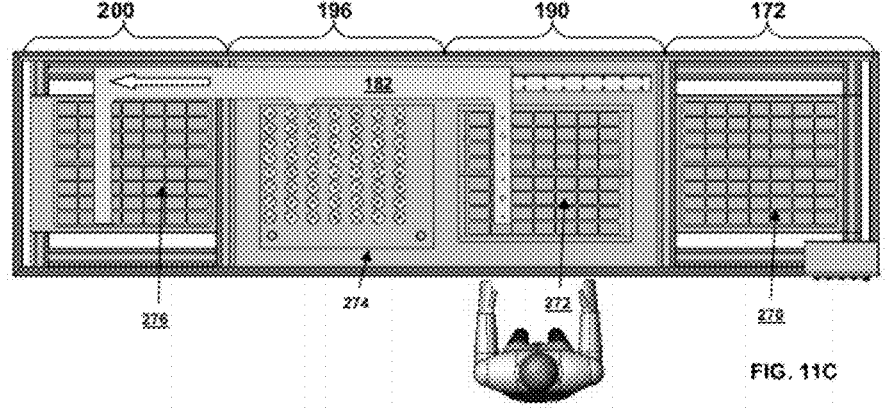

With reference to FIGS. 11A-C, movement of the transport member 182 with respect to the input magazine 172, processing station 190, marking station 196, and output magazine 200 between a first and second position is shown. In FIG. 11A, the transfer member 182 is generally in a home position. When in the home position as depicted in FIG. 11a, the transfer member 182 may be position such that the first vacuum transfer unit 184, the second vacuum transfer unit 186, and the third vacuum transfer unit 187 are generally disposed between predetermined locations (270, 272, 274, 276) such that the vacuum transfer units (184, 186, 187) do not interfere with the operation of the system 170. The transfer member 182 may be disposed in this home position as depicted in FIG. 11A during the processing and marking performed by the processing station 190 and the marking station 196 respectively.

With further reference to FIG. 11B, the transfer member 182 may be moved to a first position as shown in FIG. 11B. When in the first position shown in FIG. 11B, the first vacuum transfer unit 184 may be generally capable of engaging one or more panels at the first predetermined location 272 corresponding to the input magazine 172. Similarly, the second vacuum transfer unit 186 may be operative to engage one or more panels at the second predetermined location 272 corresponding to the processing station 190. The third transfer unit 187 may also be operative to engage one or more panels at the third predetermined location 274 corresponding to the marking station 196. When in the first position, the vacuum transfer unit 184 may be able to engage panels at the above mentioned predetermined locations (e.g., by lowering the vacuum pickup heads of each vacuum transfer unit in relation to the panel to engage the panel using a vacuum).

In turn, the transfer member 182 may be moved to a second position as shown in FIG. 11C. In this regard, each of the vacuum transfer units may maintain vacuum engagement of the panels engaged when in the first position such that the first vacuum transfer unit 184 may be operative to transport the engaged panels to a different predetermined location than the predetermined location from which they were engaged. For instance, the transfer member 182 may be operative to transport one or more panels engaged at the first predetermined location 270 corresponding to the input magazine 172 when in the first position as shown in FIG. 11B and transfer the one or more panels to the second predetermined location 272 corresponding to the processing station 190 when in the second position as shown in FIG. 11C. Similarly, the one or more panels engaged by the second vacuum transfer unit 186 at the second predetermined location 272 corresponding to the processing station 190 when in the first position as shown in FIG. 11B may be moved when the transfer member 182 is moved to the second position as shown in FIG. 11C such that the second vacuum transfer unit 186 may be positioned generally with respect to the third predetermined location 274 corresponding to the marking station 196 such that the panels that were at the second predetermined location 272 corresponding to the processing station 190 are transported to the third predetermined location 274 corresponding to the marking station 196. Also, the panels engaged by the third vacuum transfer unit 187 at the third predetermined location 274 corresponding to the marking station 186 when the transfer member 182 is in the first position as shown in FIG. 11B may be moved to the fourth predetermined location 276 corresponding to the output magazine 200 when the transfer unit 182 has been moved to the second position shown in FIG. 11C. In this regard, movement of the transfer member 182 between the first and second positions as shown in FIGS. 11B and 11C, respectively, may facilitate transporting panels in the system. The panels may generally be transported sequentially within the system 170.

The system 170 and all peripheral equipment may be automatically controlled by a system controller which may be located in the main control panel 208. The main control panel may house a programmable logic control (PLC), servo controller, and all power distribution equipment. The main control panel may be fitted with a power isolation switch. The PLC may provide control logic to control the operation of the system 170 autonomously. That is, various sensors, actuators, and the like may be provided in the system to automatically perform the processing described above. In turn, human interaction with the system may be limited to loading and unloading of panels 174 to and from the system 170. Furthermore, the PLC may be in communication with an operator interface 206. The operator interface 206 may allow an operator to interface with the system 170. This may allow the operator to provide inputs for selective control of the system 170. Additionally, the operator interface 206 may provide necessary information to the operator. This information may include an indication that the output magazine is full or that the input magazine has been emptied. Also, faults or errors encountered by the system 170 may be displayed to the operator through the operator interface 206 so that the operator may address the faults or errors accordingly.

Figure 13:
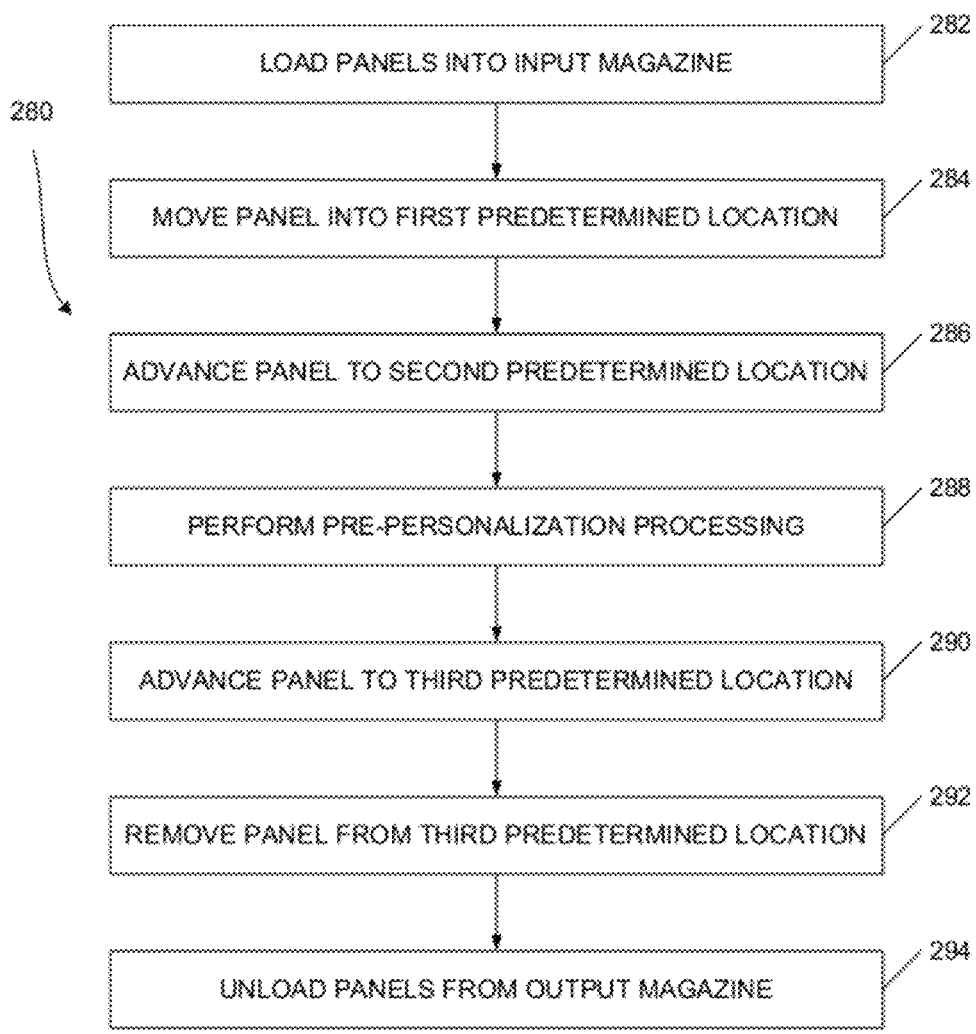
FIG. 13 is a flow chart of an embodiment of a process for pre-personalization processing of panels of smart card portions.

With reference to FIG. 13, a process 280 for automated production processing of smart cards is presented in the form of a flowchart. The process 280 may generally involve loading 282 panels into an input magazine. After the loading 282, the process 280 may include moving 284 a panel from the input magazine into a first predetermined location.

The process 280 may further include advancing 286 a panel from the first predetermined location to a second predetermined location. Once advanced 286 to the second predetermined location, the process 280 may include performing 288 at least one pre-personalization process substantially simultaneously on each card portion of the panel.

Figure 14:
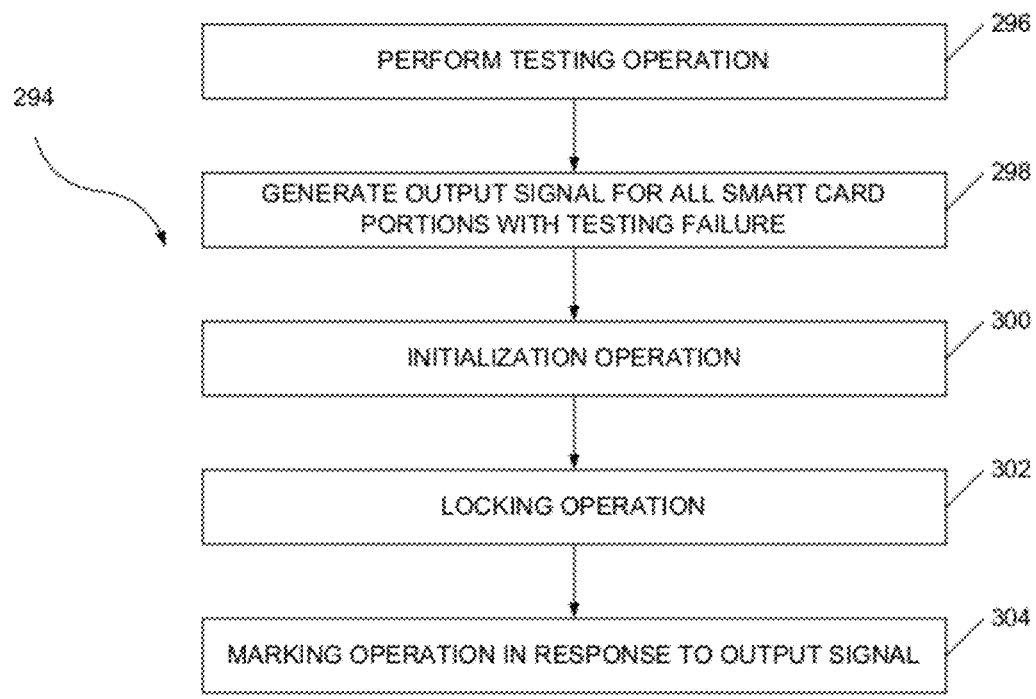
FIG. 14 is a flow chart of an embodiment of pre-personalization operations.

With additional reference to FIG. 14, a flowchart depicting a protocol 294 for a pre-personalization process is shown. The protocol 294 may include performing a testing operation 296. Based on the results of the testing operation 296, the protocol 294 may generate 298 an output signal for each smart card portion having a corresponding testing failure. The protocol 294 may further include initializing 300 a COS for each card portion. Furthermore, the protocol 294 may include a locking operation 302 wherein security data is transferred to each smart card portion. Also, a marking operation 304 may be performed in response to an output signal generated 298 in response to the testing operation 296.

Returning to FIG. 13, once the performing 288 has been completed the process 280 may include advancing 290 the panel to a third predetermined location. Once advanced 290 to the third predetermined location, the process 280 may include removing 292 the panel from the third predetermined location. Finally, the process 280 may include unloading 294 panels from the output magazine.

Figure 15:
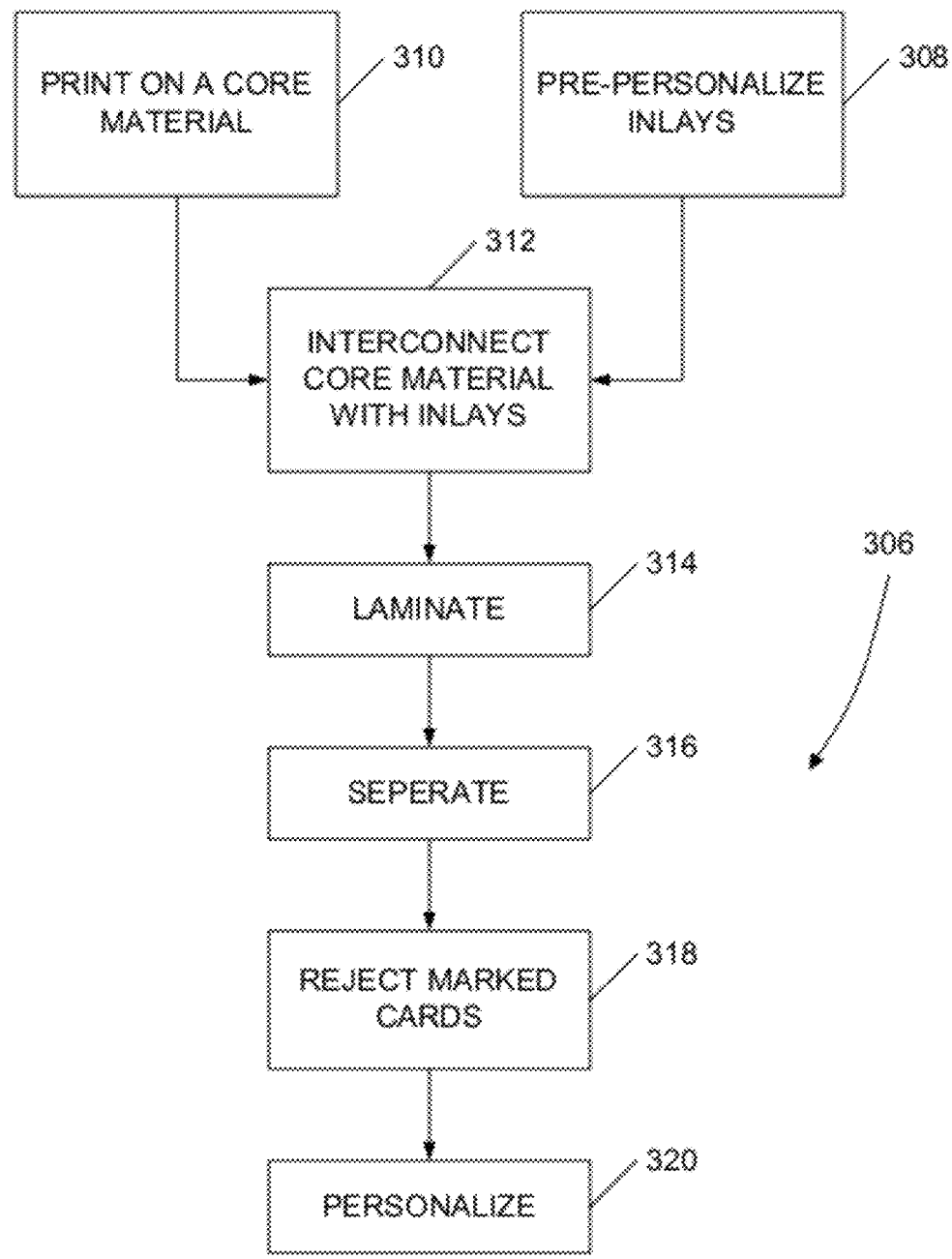
FIG. 15 is a flow chart of an embodiment of a smart card processing operation.

With reference to FIG. 15, a flow chart of a production process 306 for producing smart cards is shown. The production process 306 may include performing a pre-personalization process 308 on panels. In one embodiment, the panels may be card inlay panels having smart card portions. The card inlay may include electronic elements supportably connected to a plastic carrier layer.

The production process 306 may also include printing 310 on a core material. The printing 310 may include the printing of indicia on the core material such as card information, client information, graphics, etc. The production process 306 may include interconnecting 312 the panels having undergone the pre-personalization process 308 with core material having undergone the printing process 310. Once interconnected 312, the inlays and core material may be laminated 314. The lamination 314 may include application of heat and/or pressure to form card stock from which the smart card portions may in turn be separated 316. Once separated 316, the production process 306 may include rejecting 318 separated cards bearing a mark from the pre-personalization process 308 that indicates the smart card portion of the panel having a corresponding testing failure. Other embodiments of the production process 306 include rejecting 318 marked smart card portions at other times during the process (e.g., immediately after pre-personalization processing 308, after interconnecting 312, after laminating 315, etc.). Finally, the production process 306 may include personalizing 320 the smart cards. The personalization process may include securely transmitting data signals corresponding to proprietary data to the smart card as well as other personalization steps such as embossing card numbers, providing a signature pad, including holograms, etc.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A system for automated production processing of smart cards, comprising:
    an input magazine adapted to store a plurality of panels, wherein each of the plurality of panels comprises a plurality of smart card portions arranged in a predetermined array pattern, and wherein each of the plurality of smart card portions includes an integrated circuit device;
    a processing station automated to successively perform a processing operation with respect to each of said plurality of panels, said processing operation relating to operability of each said integrated circuit device, wherein for each given one of said plurality of panels said processing station is automated to perform the processing operation substantially simultaneously with respect to each of the corresponding plurality of smart card portions thereof; and;
    an output magazine adapted to store said plurality of panels; and,
    a transfer member automated to sequentially transfer each of said plurality of panels between a plurality of predetermined locations within the system.

2. The system for automated production processing of smart cards as recited in claim 1, wherein said transfer member is automated to simultaneously transfer at least two different ones of said plurality of panels sequentially between different ones of said plurality of predetermined locations within the system.

3. The system for automated production processing of smart cards as recited in claim 2, wherein said different ones of said plurality of predetermined locations correspond with different ones of said input magazine, said processing station, and said output magazine.

4. The system for automated production processing of smart cards as recited in claim 3, wherein said plurality of predetermined locations lie in substantially a common plane.

5. The system for automated production processing of smart cards as recited in claim 4, wherein said input magazine and said output magazine are operable to store said plurality of smart cards in a substantially parallel, stacked relation.

6. The system for automated production processing of smart cards as recited in claim 5, wherein said input magazine is located at a first corresponding one of said plurality of predetermined locations, and wherein said output magazine is located at a second corresponding one of said plurality of predetermined locations.

7. The system for automated production processing of smart cards as recited in claim 6, wherein said input magazine is automated to sequentially move said plurality of panels into said first corresponding one of said plurality of predetermined locations, and wherein said output magazine is automated to sequentially move said plurality of panels from said second corresponding one of said plurality of predetermined locations.

8. The system for automated production processing of smart cards as recited in claim 7, wherein said input magazine sequentially moves said plurality of panels from an offset, parallel, stacked relation relative to said first corresponding one of said plurality of predetermined locations into said first corresponding one of said plurality of predetermined locations, and wherein said output magazine sequentially moves said plurality of panels from said second corresponding one of said plurality of predetermined locations into an offset, parallel, stacked relation relative to said second corresponding one of said plurality of predetermined locations.

9. The system for automated production processing of smart cards as recited in claim 1, wherein said processing station is automated to perform at least one of the following automated processing operations:
   a testing operation to automatically test at least one predetermined functionality relating to each of said integrated circuit devices and operable to generate an output signal indicative of any given smart card portion having a corresponding test failure;
   an activation operation to activate an operating system for each of said integrated circuit devices;
   a locking operation to lock each of said integrated circuit devices with security data; and
   a marking operation responsive to said output signal to mark said any given smart card portion having a corresponding test failure and enables automated recognition of said any given smart card portion having a corresponding test failure.

10. The system for automated production processing of smart cards as recited in claim 9, wherein said processing station performs said testing, and said system further comprises:
    a second processing station that is automated to perform said marking operation on said any given smart card portion having a corresponding testing failure.

11. The system for automated production processing of smart cards as recited in claim 10, wherein said second processing station further comprises:
    a plurality of punch and die stations disposed in relative locations corresponding to said predetermined array pattern and operative to remove a portion within or adjacent to said any given smart card portion having a corresponding testing failure.

12. The system for automated production processing of smart cards as recited in claim 11, wherein said plurality of punch and die stations further comprises:
    a first plurality of punch and die stations disposed in relative locations corresponding to said predetermined array pattern for a first panel; and
    a second plurality of punch and die stations disposed in relative locations corresponding to said predetermined array pattern for a second panel;
    wherein said first plurality of punch and die stations and said second plurality of punch and dies stations are adjustable between an adjacent relative position and a spaced apart relative position.

13. The system for automated production processing of smart cards as recited in claim 1, wherein said processing station further comprises:
    a plurality of communication devices disposed in relative locations corresponding to said predetermined array pattern and automated to communicate signals substantially simultaneously with respect to each of said of said plurality of smart card portions.

14. The system for automated production processing of smart cards as recited in claim 13, wherein said plurality of communication devices are operative to perform said processing operation with respect to a corresponding one of said plurality of smart card portions for each given one of said plurality of panels.

15. The system for automated production processing of smart cards as recited in claim 14, wherein each of said plurality of smart card portions further comprises:
    an antenna;
    wherein said testing operation automatically tests at least one predetermined functionality relating to said antenna for each of said plurality of smart card portions; and
    wherein each of said plurality of communication devices further comprises:
       a transceiver automated for wireless signal communication with said antenna.

16. The system for automated production processing of smart cards as recited in claim 15, wherein said transceivers further comprise:
    a first plurality of transceivers disposed in relative locations corresponding to said predetermined array pattern for a first panel; and
    a second plurality of transceivers disposed in relative locations corresponding to said predetermined array pattern for a second panel;
    wherein said first plurality of transceivers and said second plurality of transceivers are adjustable between an adjacent relative position and a spaced apart relative position.

* * * * *